United States Patent [19]
Dummermuth

[11] Patent Number: 6,073,053
[45] Date of Patent: Jun. 6, 2000

[54] INDUSTRIAL CONTROLLER INPUT/OUTPUT CARD PROVIDING REFLEX RESPONSE

[75] Inventor: Ernst Dummermuth, Chesterland, Ohio

[73] Assignee: Rockwell Technologies, LLC, Thousand Oaks, Calif.

[21] Appl. No.: 09/057,259

[22] Filed: Apr. 8, 1998

[51] Int. Cl.[7] .................................................. G05B 15/00
[52] U.S. Cl. ................................................. 700/2; 710/58
[58] Field of Search .............................. 700/2, 3, 9, 71, 700/72; 710/58, 60

[56] References Cited

U.S. PATENT DOCUMENTS

| | | | |
|---|---|---|---|
| 4,165,534 | 8/1979 | Dummermuth et al. ................... 700/3 |
| 4,872,136 | 10/1989 | Cieri et al. ................... 710/58 |
| 5,636,124 | 6/1997 | Rischar et al. ................... 700/100 |
| 5,912,814 | 6/1999 | Flood ................... 700/2 |
| 5,958,011 | 9/1999 | Arimilli et al. ................... 709/224 |
| 6,024,477 | 2/2000 | Bauer et al. ................... 700/3 |

*Primary Examiner*—William Grant
*Assistant Examiner*—Zoila Cabrera
*Attorney, Agent, or Firm*—Keith M. Baxter; John J. Horn; A. M. Gerasimow

[57] ABSTRACT

A reflex I/O card for an industrial controller receives enabling inputs from the executed control program and triggering inputs from an industrial process to provide outputs at a fixed delay in time or portion of a machine cycle after the inputs through dedicated hardware thus avoiding transmission delays and processing delays associated with the communication of information to a central processor and the execution of the control program.

14 Claims, 2 Drawing Sheets

INDUSTRIAL CONTROLLER INPUT/OUTPUT CARD PROVIDING REFLEX RESPONSE

BACKGROUND OF THE INVENTION

The present invention relates to industrial controllers for the real time control of industrial processes, and in particular to an input/output (I/O) card providing for extremely fast control response to certain signals from the industrial process.

Industrial controllers are special purpose computers used for controlling industrial processes and manufacturing equipment. Under the direction of a stored program, the industrial controller examines a series of inputs reflecting the status of the control process and changes a series of outputs controlling the industrial process. The inputs and outputs may be binary, that is on or off, or analog providing a value within a continuous range.

An industrial controller differs from a conventional computer in a number of ways. First, unlike a computer, the industrial controller is normally customized to an individual application both by writing new control software stored in the controller's memory, and by changing the hardware configuration of the controller itself.

The ability to reconfigure the controller hardware economically is provided by dividing the industrial controller into a number of modules each performing a different function. Different combinations of the modules may be connected together on a backplane or by one or more communication links. The modules may include, for example, processors, power supplies, communication interfaces and input/output modules. Each module generally incorporates a microprocessor and related circuitry and operates according to a local stored program. Interconnecting the modules over communication links allows the various components of the industrial controller to be separated by a considerable distance over an expanse of a large factory or manufacturing operation. In this way, for example, input and output modules may be located near the portions of the machine from which they receive signals and to which they provide signals.

An industrial controller differs also from a conventional computer in that it is designed to provide "real-time" control, that is control output signals that respond in a near instantaneous manner to changes in the input signals from the controlled process. Generally such real-time control requires the use of a high speed network to communicate data between the I/O modules and the central processor of the industrial controller, and a high speed processor that may scan rapidly through a control program. Particularly for demanding applications such as high speed bottling lines, the delay inherent in this control process may be significant. Accordingly, there is continual effort expended in developing higher speed communication links and increasingly fast processors to minimize any delay.

SUMMARY OF THE INVENTION

The present inventor has recognized that a large number of high speed control problems involve a situation where, after an arbitrary set of predicate conditions that are not time critical have become true, the industrial controller must rapidly respond to a given control input at a fixed period of time or a fixed fraction of a machine cycle after the assertion of that input. In such cases, a special I/O module that could be enabled by the industrial controller to provide a reflex response to the input would eliminate the need for high speed communication between the I/O card and the central processor. The central processor could still establish general conditions for the occurrence of an output by enabling the reflex response, but the time critical last stages of the response would be generated by local specialized hardware.

Specifically, the present invention provides an industrial controller having an I/O module communicating with a central processor, the I/O module having an output terminal providing an electrical output to the industrial process and a first and second input terminal receiving first and second electrical inputs from the industrial process. A logic circuit within the I/O module receives an enable signal from the central processor and the second electrical input to produce the electrical output upon the assertion of the enable signal and the second electrical input. The central processor receives the first electrical input and executes the control program to provide the enable signal based on the first electrical input and the control program.

Thus, it is one object of the invention to provide for extremely fast response to certain control situations within the context of a general purpose industrial controller by avoiding communication of control data to the central processor.

It is another object of the invention to eliminate the cost and complexity of high speed communication networks and controllers when fast response requirements are confined to a few simple delay type requirements.

The logic circuit may include a timer or counter, the counter connected to a sensor providing an indication of progress of a machine cycle. The timer or counter may be triggered by the enable signal and the second electrical input to cause the electrical output to be produced at a predetermined time or portion of a machine cycle after the assertion of the enable signal and the second electrical input or to remain asserted for a predetermined time or portion of a machine cycle. The counter or timer may be programmable by the central processor.

It is thus another object of the invention to allow programmable control of delay or duration of the output signal to be defined as either time or a portion of a machine cycle, such as a movement of a part or a rotation of a shaft, to accommodate a wide range of control situations with simple high speed circuitry.

It is yet another object of the invention to provide an intuitive paradigm for a broad class of high speed control problems. A complex control strategy may be abstracted to a single enable signal and the final control steps seen as enabling a signal path between a triggering signal and the output signal with a programmed delay and a programmed duration.

The foregoing objects and advantages of the invention will appear from the following description. In the description references are made to the accompanying drawings which form a part hereof and in which there is shown by way of illustration a preferred embodiment of the invention. Such embodiment does not necessarily represent the full scope of the invention, however, and reference must be made, therefore to the claims for interpreting the scope of the invention.

DETAILED DESCRIPTION OF THE PREFERRED EMBODIMENT

Figure 1:
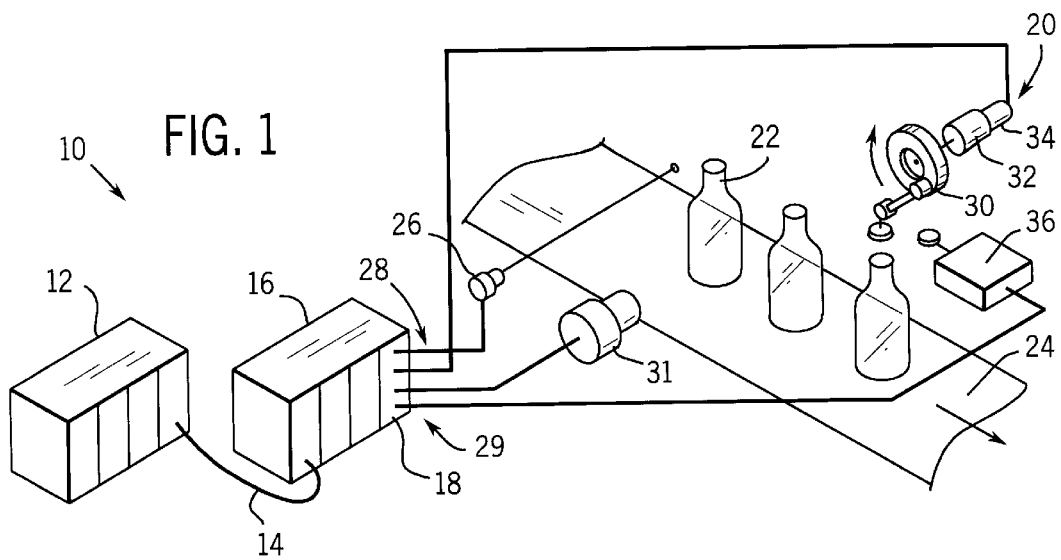
FIG. 1 is a perspective view of a simplified industrial process and controller, the process having a high speed conveyor line providing inputs to remote I/O cards which in turn provides outputs to components of the conveyor line based on communications with a central controller executing a stored program.

Referring now to FIG. 1, an industrial control system 10 includes a central processor 12 communicating via a communication network 14 with a remote I/O rack 16. The I/O rack 16 includes one or more I/O cards 18 that may be connected via terminals 66 (shown in FIG. 2) with various components of an industrial process 20 to receive signals from the industrial process 20 indicating the state of the industrial process 20 and to provide control signals to the industrial process 20.

An example industrial process 20 is the operation of a bottle capping line shown schematically in FIG. 1. In this example, bottles 22 may be moved along a conveyor 24 past an optical sensor 26 providing an input signal 28 to an I/O card 18 of the I/O rack 16. The input signal 28 from the optical sensor 26 may be used to trigger an inspection camera 31 at a predetermined time or count after the optical sensor 26 is interrupted by a bottle 22 so that a given bottle 22 will be centered within the field of view of the camera 31. The bottle capping line may also include an actuator assembly 30 driven by a motor 32 attached to a rotary encoder 34 that provides a second input signal 28 to the I/O card 18. As will be understood in the art, this input signal from the rotary encoder may include a zero mark indicating an arbitrary zero point in the actuation cycle of the actuator assembly 30 and a number of encoder pulses dividing the cycle of the actuator assembly 30 into regular angular or positional intervals. Based on the input signals 28 from the encoder 34, a cap placement actuator 36 may be activated so that a cap is placed above the bottle 22 by a cap placement actuator 36 at the correct moment in the cycle of the actuator assembly 30.

Figure 2:
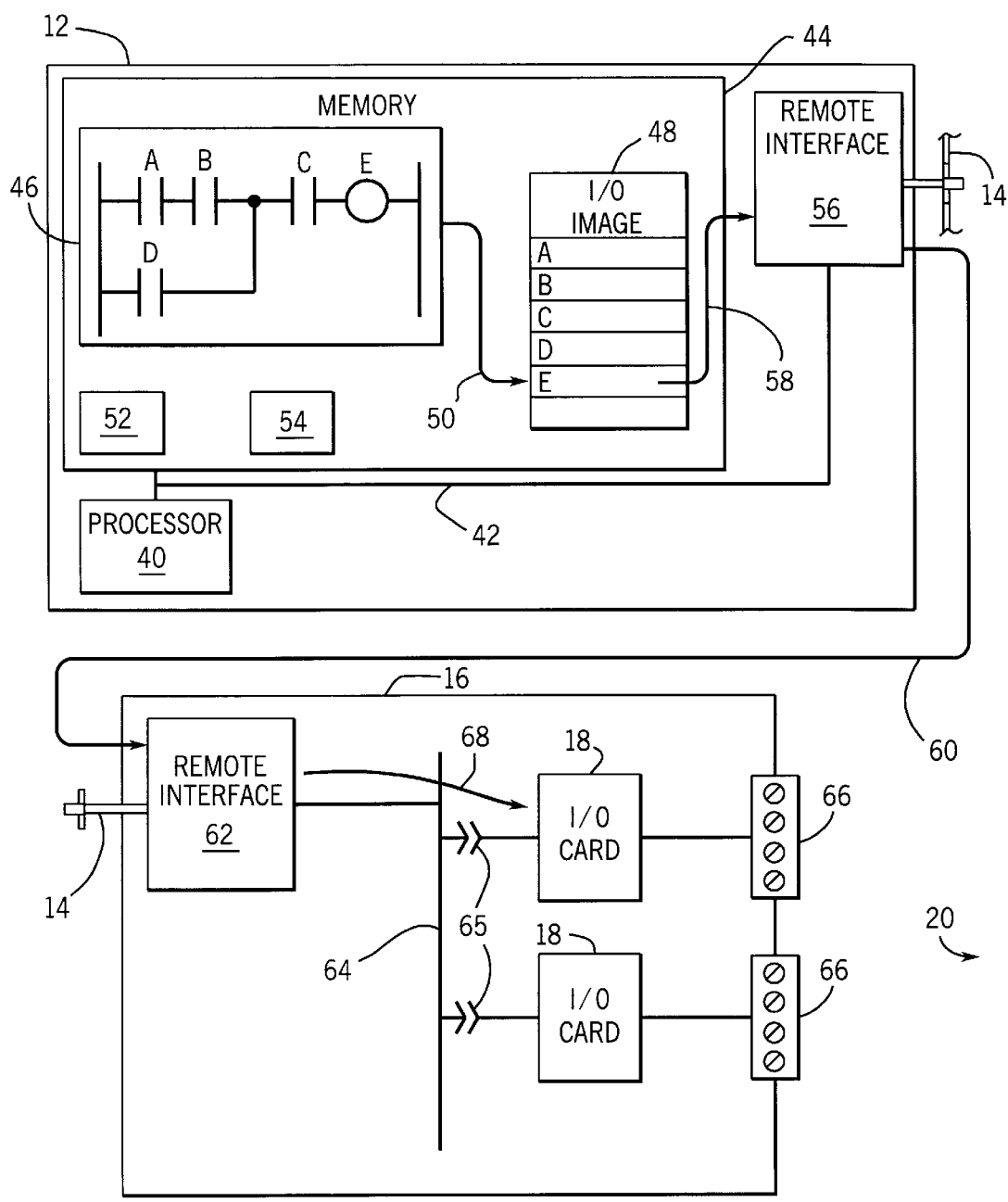
FIG. 2 is a block diagram of the central controller and the remote I/O cards of FIG. 1 showing the stored program in memory as may exchange data values with the remote I/O cards through an I/O image table and showing a communication link between the controller and an I/O rack holding the I/O cards removably attached to a backplane.

Referring now to FIG. 2, the central processor 12 includes generally a processor module 40 communicating on an internal bus 42 with a memory 44. The memory 44 holds a control program 46 represented in FIG. 2 as a rung of a relay ladder program of a type well known in the art. The rung has conventionally rendered contacts representing input signals from the industrial process 20 or other variables (labeled A, B, C and D) and a coil (labeled E) representing an output signal to the industrial process 20 or to other variables. The processor module 40 during operation executes the control program 46 to read the values of the contacts from an I/O image table 48 and to write the values of the coils back to the I/O image table, the latter as indicated by arrow 50. The memory 44 may also include a general operating system 52 for operating the central processor 12 and other variable storage areas 54 as will be understood in the art.

The I/O image table 48 is updated asynchronously by a network interface 56 which also communicates on bus 42 and is in turn connected to the communication network 14.

In this updating process, input signals 28 from the industrial process 20 are received by the network interface 56 from the communication network 14 and written to the I/O image table 48 and output values are read from the I/O image table 48 and transmitted on the communication network 14. The updating of output value E from the I/O image table 48 to the remote I/O rack 16 is shown by arrows 58 and 60.

The remote I/O rack 16 includes a network interface 62, similar to that in the central processor 12 and well understood in the art, which communicates between the communication network 14 and an internal backplane 64 connected to one or more I/O cards 18. The data is transmitted from the network interface 62 to the I/O cards as indicated by arrow 68. Similarly but not shown in FIG. 2, data received from the industrial process 20 by the I/O cards 18 may be transmitted via the backplane 64 through the network interface 62 to the network interface 56 for storage in the I/O image table. The processor module 40 may also transmit non-I/O data to the remote I/O card 18 to configure the I/O cards 18 as is well understood in the art.

Each I/O card 18 provides a terminal strip 66 to which input signals 28 and output signals 29 of the industrial process 20 may be connected. The I/O cards are attached to the backplane 64 by removable connectors 65 so that different I/O cards may be placed in the I/O rack 16 depending on the application.

Figure 3:
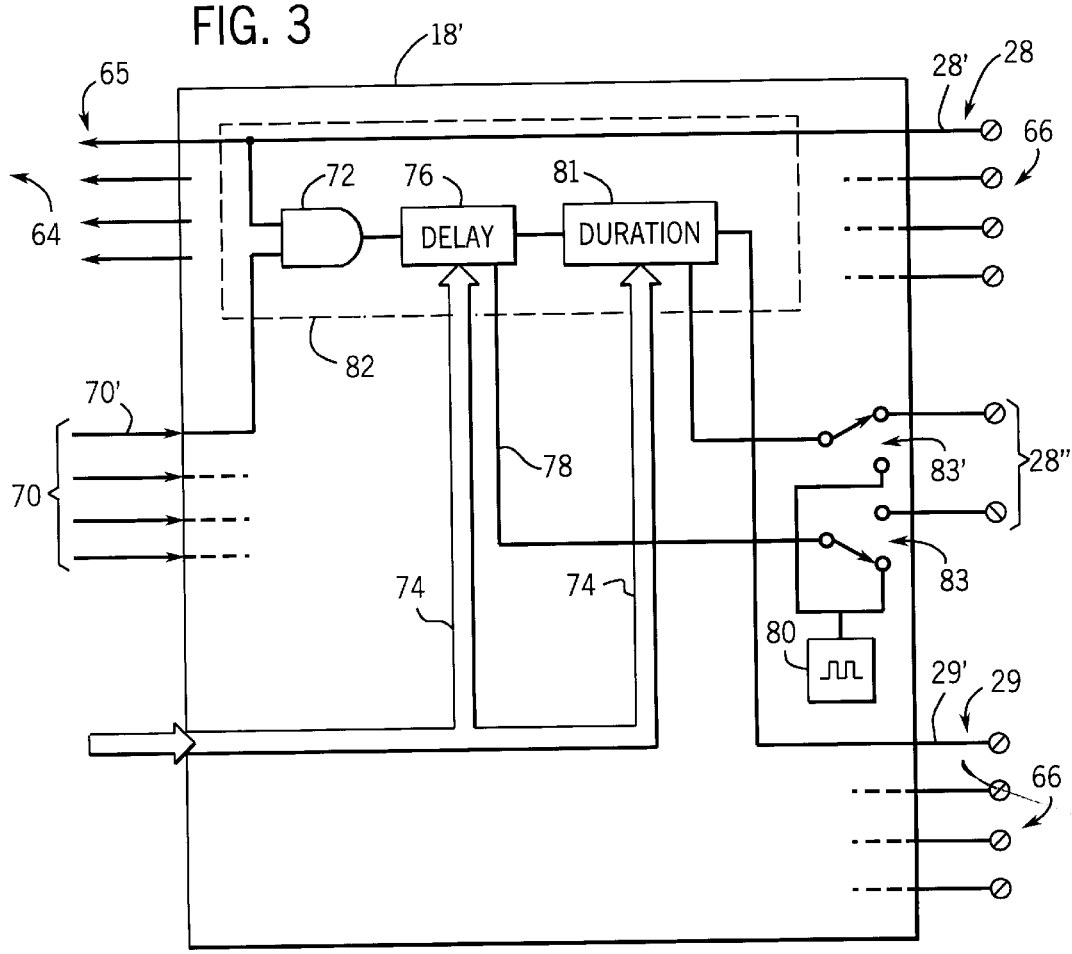
FIG. 3 is a block diagram of one I/O card of FIG. 2 incorporating the present invention to receive and transmit data over the backplane and to communicate with the controlled process, the I/O card rapidly producing output signals to the controlled process without the delays of communicating over the backplane to the central processor. One or more such reflex response circuits may be realized on one I/O card.

Referring now to FIG. 3, an I/O card 18' incorporating the present invention receives output values from the network interface 62 over lines 70 (including output value E over line 70'). The I/O card 18', through terminals 66, may also receive a triggering input 28' such as from the optical sensor 26 or the zero mark signal from the encoder 34. The triggering input 28' may be passed to the backplane 64 to be transmitted to the processor module 40, but also provides one input of a dual input AND gate 72. The other input to the dual input AND gate 72 is provided by the output value E from line 70'. Upon occurrence of the trigger input signal 28' and a prior and continuing occurrence of enabling input E from line 70' (which may be in turn a function of a number of other inputs as dictated by the control program 46 of FIG. 2), the output of the AND gate 72 will be asserted.

The output of AND gate 72 is connected to a programmable delay circuit 76, such as a programmable count-down counter well understood in the art. Specifically, the output of the AND gate 72 connects to a trigger input of the delay circuit such as starts the counter counting downward. The delay circuit 76 further receives a program value 74 from the backplane 64 so as to be configurable by the central processor 12. The program value provides an initial count value which is counted down from when the trigger input is enabled. When a value of zero is reached, the delay circuit 76 provides an output signal as will be described.

The delay circuit 76 also receives a clock input 78 which may be selectable to be either an internal time base 80 such as a crystal oscillator or the like or another input signal 28" which may come from the encoder pulses of the encoder 34. The selection is provided by a programmable switch 83 that may be set by values passed from the processor module 40 or by simply placing jumpers in the proper way. The clock input controls the downward counting of the delay circuit 76, thus, the delay provided by the delay circuit 76 may be dependent on time or on movement of a component of the industrial process 20 as measured by the encoder 34. This latter measurement, being periodic, will be termed a "machine cycle" and the delay provided by the delay circuit 76 will provide for passage of a fixed portion of a machine cycle from a predetermined point in the machine cycle indicated by the zero mark signal of the encoder 34 or from an event trigger such as from an optical sensor.

The output from the delay circuit 76 is received by a duration circuit 81 which includes a latch holding the asserted value of the output of the delay circuit 76 and passing this latched output to terminals 66 as output signals 29'. In the case where the delay circuit 76 is clocked by the internal time base 80 for example, the output signal 29' may be used to trigger the video camera 31. In the case where the delay circuit 76 is clocked by the encoder 34, the output signal 29' may cause activation of the cap placement actuator 36.

The duration circuit 81, besides latching the output from the delay circuit 76, provides a second programmable countdown counter well known in the art such as may be programmed by the central processor 12 through lines 74' in a manner analogous to that of the delay circuit 76. Again the duration circuit 81 may be clocked either by the internal time base 80 or the input signal 28'. At the conclusion of counting down (when zero has been reached), the duration circuit 81 resets its latch so that output 29' returns to an unasserted state.

Typically, in either case, the enable signal 70' from the central processor 12 will be asserted substantially before the assertion of the triggering input signal 28' and the programming of the delay circuit 76 and duration circuit 81 will occur also before the assertion of the input signal 28'. Thus, when the input signal 28' is asserted, the output signal 29' will occur at the programmed delay and for the program duration without additional delays imposed by the operation of the processor module 40 or the communication network 14.

The reflex circuit 82 comprising AND gate 72, delay circuit 76, and duration circuit 81 may be reproduced multiple times for multiple outputs and inputs on one circuit card 16'. The internal time base 80 may be a system clock so as to synchronize accurately multiple I/O cards 18' with each other.

Thus, for example, returning to FIG. 1, an extremely precise fixed time delay may be provided between the receipt of an input signal from the optical sensor 26 and a triggering of the camera 31 or an extremely precise cycle delay may be provided between the actuator assembly 30 reaching its zero point and the insertion of a cap by cap placement actuator 36 in the path of the capping arm. Clearly the device is not limited to the example bottle capping line but may be used in a wide variety of control situations where precise delays are required that must be immunized from variation caused by processing or information transmission delays.

The above description has been that of a preferred embodiment of the present invention. It will occur to those that practice the art that many modifications may be made without departing from the spirit and scope of the invention. In order to apprise the public of the various embodiments that may fall within the scope of the invention, the following claims are made.

I claim:

1. An industrial controller producing electrical outputs to control an industrial process based on the execution of a control program and the values of electrical inputs received from the industrial process, the industrial controller comprising:
    a) an I/O module including:
        i) an output terminal providing an electrical output to the industrial process;
        ii) a first and second input terminal receiving first and second electrical inputs from the industrial process;
        iii) a logic circuit within the I/O module receiving an enable signal from a central processor and the second electrical input to assert the electrical output upon the assertion of the enable signal and the second electrical input;
    b) a central processor communicating with the I/O module to receive the first electrical input and executing the control program to provide the enable signal based on the first electrical input and the control program; whereby the electrical output may rapidly respond to the second electrical input while remaining under the control of the control program.

2. The industrial controller of claim 1 including a communication network over which the central processor and I/O module communicate.

3. The industrial controller of claim 1 wherein the logic circuit transmits the second electrical input to the central processor.

4. The industrial controller of claim 1 wherein the logic circuit includes a delay timer triggered by the enable signal and the second electrical input to cause the electrical output to be asserted a predetermined time after the assertion of the enable signal and the second electrical input.

5. The industrial controller of claim 4 wherein the timer is programmable and wherein the execution of the control program by the central controller causes the communication of the predetermined time to an I/O module.

6. The industrial controller of claim 1 wherein the I/O module includes a duration timer triggered by the enable signal and the second electrical input to cause the electrical output to remain active a predetermined time after the assertion of the enable signal and the second electrical input.

7. The industrial controller of claim 6 wherein the timer is programmable and wherein the execution of the control program by the central controller causes the communication of the predetermined time to I/O module.

8. The industrial controller of claim 1 wherein the logic circuit is an AND gate having one input receiving the enable signal and a second input receiving the second electrical input.

9. The industrial controller of claim 1 wherein the industrial process includes a sensor providing a periodic signal indicating progress of a machine cycle, and wherein the logic circuit includes a counter having a count input communicating with a third input terminal connected to the sensor, the counter activated by the enable signal and the second electrical input to cause the electrical output to be asserted at a predetermined count after the assertion of the enable signal and the second electrical input.

10. The industrial controller of claim 9 wherein the counter is programmable and wherein the execution of the control program by the central controller causes the communication of the predetermined count to I/O module.

11. The industrial controller of claim 9 wherein the I/O module includes a duration timer triggered by the counter to hold the electrical output asserted a predetermined duration after the assertion of the electrical output.

12. The industrial controller of claim 1 wherein the industrial process includes a sensor providing a periodic signal indicating progress of a machine cycle, and wherein the logic circuit includes a counter having a count input communicating with a third input terminal connected to the sensor, the counter activated by the enable signal and the second electrical input to cause the electrical output to remain asserted for a predetermined count after the assertion of the enable signal and the second electrical input.

13. The industrial controller of claim 12 wherein the counter is programmable and wherein the execution of the control program by the central controller causes the communication of the predetermined count to I/O module.

14. The industrial controller of claim 12 wherein the I/O module includes a delay timer triggered by the second electrical input to trigger the counter at a predetermined time after the assertion of the enable signal and the second electrical input.

* * * * *